United States Patent
Beck

[15] 3,676,580

[45] July 11, 1972

[54] INTERROGATED TRANSPONDER SYSTEM

[72] Inventor: Joseph H. Beck, Kew Gardens, N.Y.

[73] Assignee: Video Information Systems, Inc., New York, N.Y.

[22] Filed: June 1, 1970

[21] Appl. No.: 41,853

[52] U.S. Cl. ....178/5.1

[51] Int. Cl. ....H04n 1/44

[58] Field of Search ....178/5.1

[56] References Cited

UNITED STATES PATENTS 3,078,337 2/1963 Shanahan et al....178/5.1

FOREIGN PATENTS OR APPLICATIONS 742,363 9/1966 Canada....178/5.1

*Primary Examiner*—Benjamin A. Borchelt
*Assistant Examiner*—S. C. Buczinski
*Attorney*—Darby and Darby

[57] ABSTRACT

An interrogated transponder system of the type which may be used for billing purposes with subscription television systems, wherein a central station interrogates a large number of individual subscriber stations to determine the condition of the subscriber's receiver and/or an associated terminal device. Each transponder includes a storage register of the type in which data may be stored in parallel and read out in serial form. The information stored in the register may represent the channel to which the receiver is tuned or the condition of a plurality of data switches which enable the subscriber to transmit data back to the central station. The subscribers may be divided into groups and subgroups with each subgroup being responsive to a different combination of frequencies transmitted by the central station. This combination of frequencies is used as an address code which identifies each individual subscriber or terminal station. One of the transmitted frequencies is used as a source of shift pulses to shift the information from the storage register as well as part of the address code which identifies the subscriber station. The output of the shift register, in serial form, is transmitted back to the central station by FSK techniques, with the frequencies employed identifying the specific subscriber within the subgroup.

19 Claims, 4 Drawing Figures

INVENTOR.
JOSEPH H. BECK

BY

Darby + Darby

ATTORNEYS

INVENTOR.
JOSEPH H. BECK

BY Darby & Darby

ATTORNEYS

INVENTOR.
JOSEPH H. BECK

BY Darby & Darby

ATTORNEYS

INTERROGATED TRANSPONDER SYSTEM

The present invention relates to interrogated transponder systems, for example, of the type which may be used for billing purposes in subscription television systems.

Interrogated transponder systems are used in many situations where it is desired to interrogate a remote station and to transmit an indication of the condition or status of the remote station and/or the status of an associated terminal device (e.g. a switch bank) back to a central station. The present invention is intended to have general utility with such systems but, in its preferred embodiment, is intended specifically for use with subscription television systems where a central station can remotely interrogate television receivers at a large number of subscriber stations (for example, 1,000,0000) and also permit, at least to a limited degree, communication back and forth between each of the individual subscriber stations and the central station. The invention may be considered an improvement over known interrogated transponder systems in that it is capable of interrogating larger numbers of subscribers with the same number of interrogation or addressing frequencies, and it can respond to more conditions of the subscriber station. In this latter respect, the present invention can be readily employed to indicate any television channel to which the subscriber's receiver may be tuned, and to indicate the condition of at least four separate data switches thereby providing the subscriber with the capability of transmitting information back to the central station.

Briefly, in accordance with the invention, each subscriber transponder is provided with a storage register which is capable of holding, in digital form, information indicating the channel to which the receiver at that station is tuned, or the condition of the subscriber's data switches. The subscribers are interrogated by transmitting frequency tones, any given combination of which identifies several subgroups of subscriber stations. One of these tones (preferably the last transmitted) is used as a source of shift pulses to empty the contents of the register so that the stored data can be transmitted back to the central station in a way which is unique to each subscriber of a given subgroup. The central station can then examine the signals received from the subscribers to determine whether the subscriber is watching his receiver and, if so, the particular channel which is being viewed. The central station can also determine the condition of the data switches if that is desired.

Prior to explaining the invention in detail, it is helpful to consider the overall system in general terms to appreciate the technique by which a single subscriber, out of possibly one million, can be located by a relatively small number of individual frequencies in a sufficiently short time to be practical to interrogate all of the individual subscribers. Thus, referring to FIG. 1, 200 separate groups of subscribers are shown by the numerals 10(1), 10(2) . . . . 10(200). Each of the subscribers of each of these groups is "connected" to the diagrammatically illustrated TV cable 11 so that whatever signals are placed on this cable can be received by each subscriber. Typically, cable 11 is a coaxial cable (e.g. as in CATV systems) carrying a number of simultaneous television signals (for example, ten) so that each of the individual subscribers can, whenever desired, view a television program corresponding to any of the different television signals on the cable.

Figure 1:
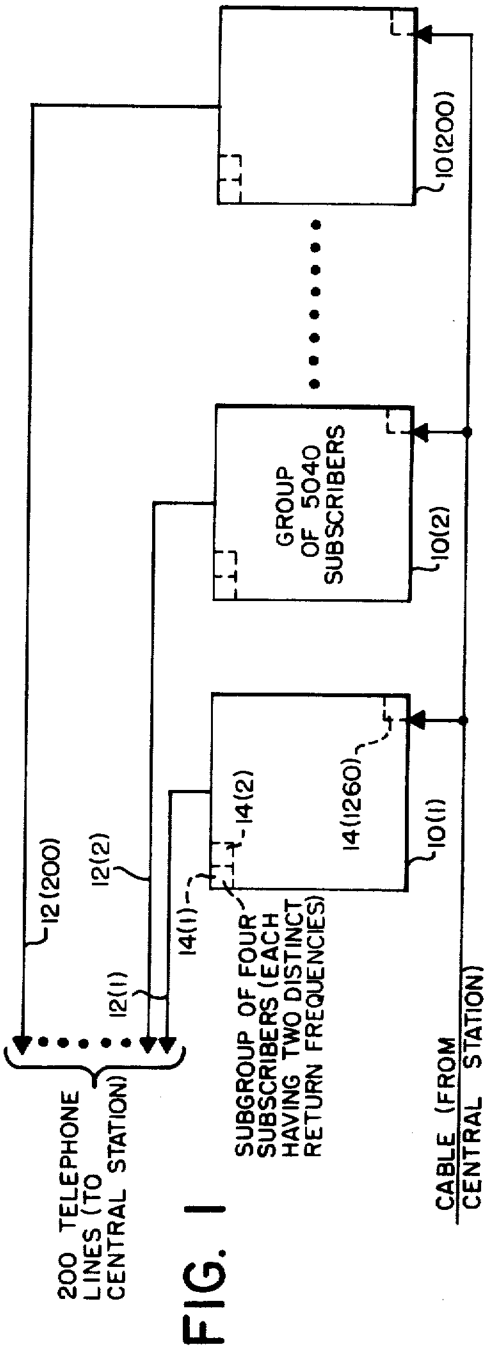
FIG. 1 is a diagrammatic illustration showing the subscribers of a typical subscription television system, for purposes of explanation.

In the typical CATV system, the subscribers are billed on a monthly basis. Accordingly, there is no need for continuously interrogating each of the individual subscribers since the extent of use is not important. However, in a subscription television system where the subscriber pays for the amount of time in which a signal is derived from the cable (and, conceivably, depending upon which signal is to be derived from the cable) it is necessary that the condition of the individual receivers be conveyed back to a central station where the information can be used to bill the subscriber. In conventional CATV systems, as they exist today, one-way amplifiers are commonly used so that it is not possible to transmit this subscriber information back to the central station on the cable 11. Accordingly, as is common, the information is transmitted back to the central station via standard telephone lines. These telephone lines are illustrated in FIG. 1 as lines 12(1), 12(2) . . . . 12(200) corresponding, respectively, to the subgroups 10.

The subscribers of each individual group 10 may be further broken up into 1,260 subgroups of four subscribers each. These individual subgroups are diagrammatically illustrated in FIG. 1 by the blocks 14(1), 14(2) . . . . 14(1260). In accordance with the present invention, each of the subscribers in a subgroup is assigned two different audio return frequencies on which the desired information can be re-transmitted back to the central station on the telephone line 12 associated with the subscriber's group. As explained in the following, for each subscriber, one frequency represents a binary "1" and the other frequency represents a binary "0". The return information for the four subscribers of each subgroup is returned to the central station at the same time, with discrimination between the subscribers at the central station being based upon the difference in frequencies.

In operation, when it is desired to interrogate the subscribers of the overall system, four separate frequencies, in groups of two each, are transmitted on cable 11 from the central station. These four frequencies select a single subgroup 14 from each of the groups 10. Accordingly, as explained below, during the first portion of an interrogation cycle, the four selected subscribers (of each subgroup) transmit data (representing the condition of the subscriber's data switches) back to the central station on their associated telephone lines 12. At the central station, the individual subscribers can be identified since the telephone line 12 indicates the group, the transmitted interrogation frequencies indicate the subgroup in each group, and the audio tones on the telephone line indicate the specific subscriber in each subgroup.

Figure 2:
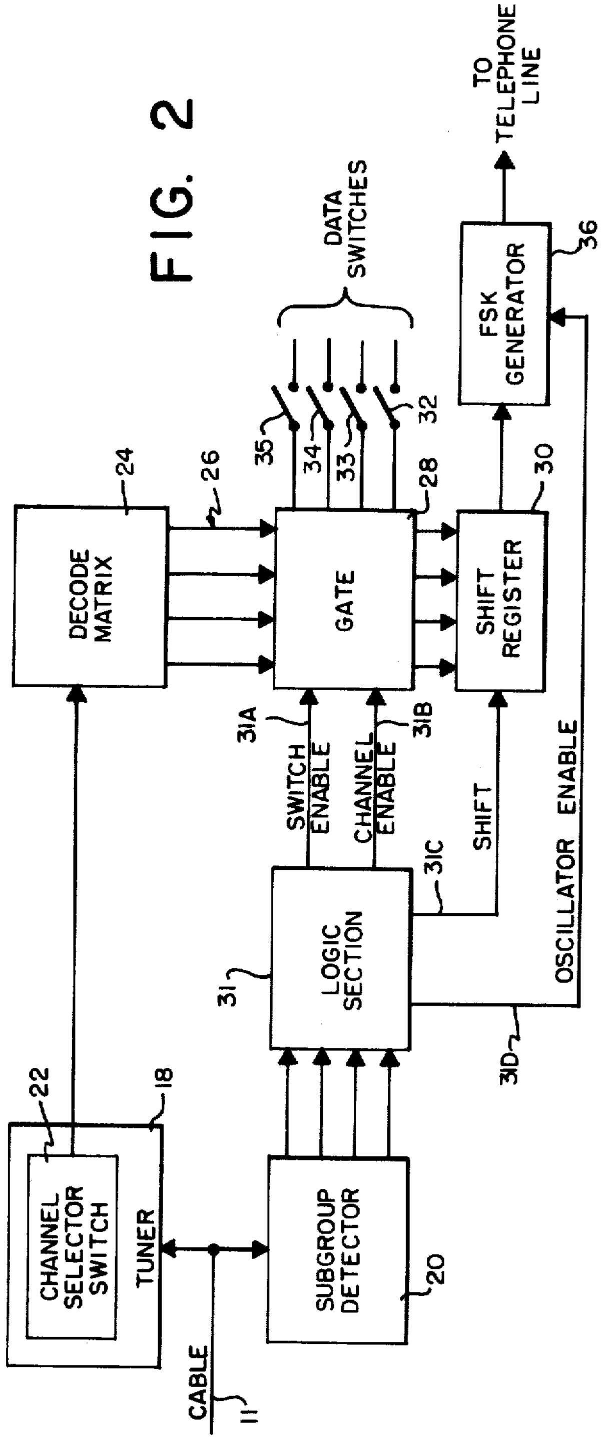
FIG. 2 is a block diagram of the invention.

FIG. 2 is a general block diagram of the overall system of the invention. The coaxial input cable is shown again at 11 coupling directly into a subgroup detector 20. The video information content on cable 11 is conducted to the television tuner 18 of the remote terminal the output of which is applied to the antenna input terminal of the subscriber's TV receiver (not shown) where it is displayed in conventional fashion. For purposes of description, the channel selector switch of the remote terminal is shown diagrammatically at 22. This is the common selector switch which permits the user to select any of the available commercial television channels for viewing. For purposes of the present description, it is assumed that there are no more than fifteen separate channels which may be viewed by the subscriber, although it will be apparent from the following description that the number of channels is not a material consideration and can readily be increased provided the size of the storage register is also increased.

The channel selector switch operates a decoding matrix 24 which produces a digital output on four parallel lines 26. The output on lines 26 may be a four-digit binary number representing the channel to which the selector switch 22 is turned. Where four binary digits are used, it is possible to represent fifteen positions of switch 22.

As explained below, the four-digit output from matrix 24 is coupled to a gate 28 which normally blocks passage of signals from matrix 24 to a shift register 30. Register 30 is a four-stage device which can receive the four digits on output lines 26 in parallel for storage purposes.

The shift register 30 may also receive information from four data switches 32, 33, 34 and 35. These switches are normally coupled through gate 28 to the four stages of register 30 so that the condition of the stages of the shift register corresponds to the condition of the respective switches. Switches 32–35 may, for example, be physically located on the exterior of the subscriber's remote terminal. They provide the user with the capability of communicating back to the central station for any desired reason. For example, if the subscriber is watching an educational television program, multiple-choice questions may be asked as part of the program material. The user would be able to select one of four answers by closing an appropriate one of the switches 32–35. By closing combinations of switches, a much larger selection of choices can be made. When this information is transmitted back to the central station, the answers can be recorded and the subscriber graded accordingly.

As indicated previously, the information input on cable 11 contains four frequency tones, in groups of two, which are used to interrogate the subscribers. Subgroup detector 20 produces four separate outputs in response to the reception of the respective interrogation tones corresponding to the subgroup to which that station belongs. The four outputs from the detector 20 are coupled to a logic section 31 which produces four outputs on lines 31A, 31B, 31C and 31D. The output line 31A (normally energized) is applied to gate 28 and serves, when deenergized, to disconnect switches 32–35 from register 30. The second output from the logic section 31 appearing on line 31B causes the channel data to be transferred to the shift register 30 via lines 26 and gate 28. Thus, not only do the frequencies appearing on the cable select and identify the individual subscribers, but, as explained below, by suitable coding they can also be used to determine what information is to be returned back to the central station, i.e. channel selection or data switch information.

The third output from logic section 31 appearing on line 31C functions as a source of shift pulses, causing the data in the shift register 30 to be transferred serially to a standard frequency shift key generator 36. The output of oscillator 36, as is well known, comprises one of two predetermined audio frequencies. The first of these audio frequencies may correspond to a binary "1" being read from the shift register 36, and the second a binary "0" read from the register. This FSK signal is then coupled directly to the telephone line of the subscriber station, which couples it back to the central station for suitable processing.

The fourth output from logic section 31 appearing on line 31D turns "on" the FSK generator 36.

Figure 3:
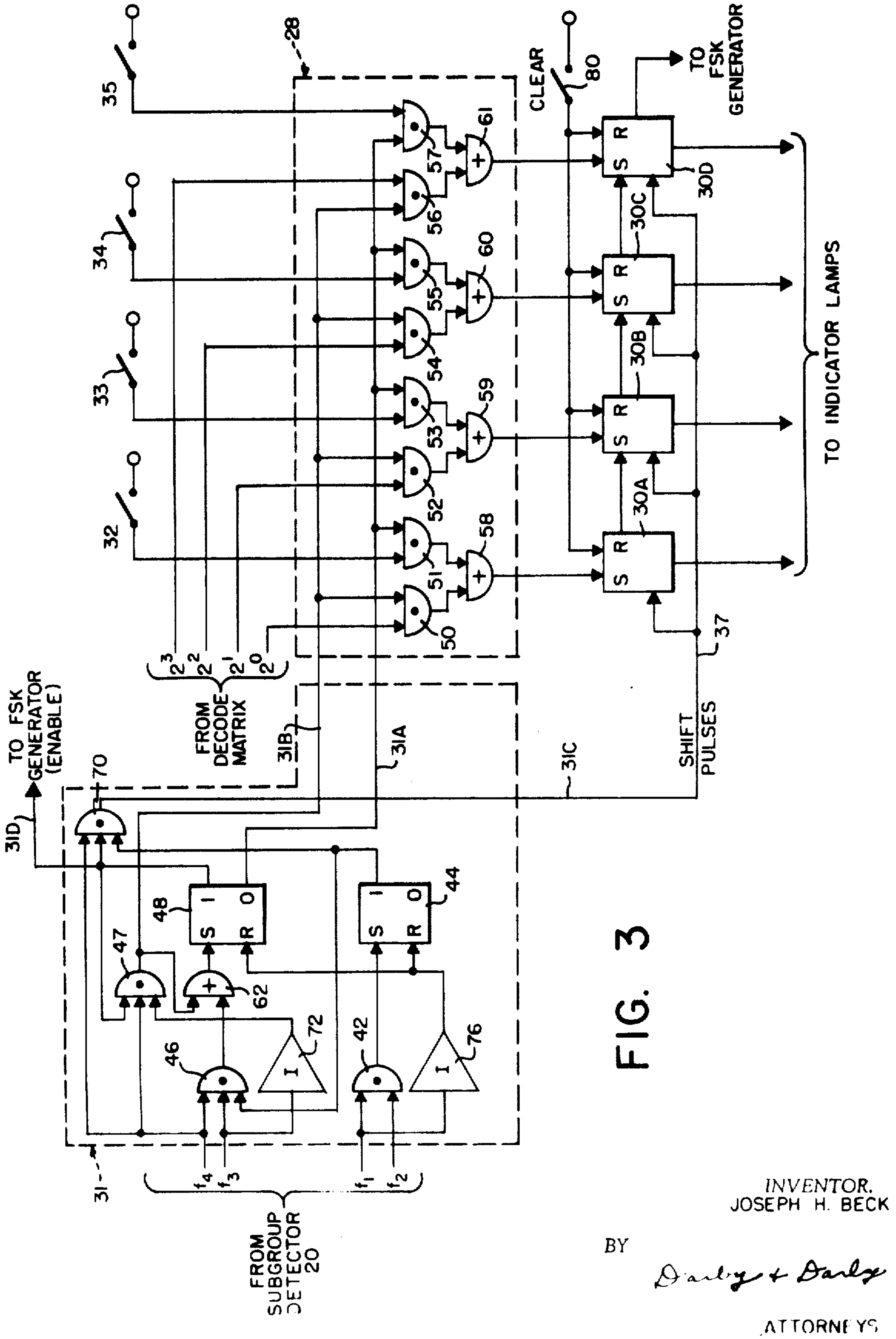
FIG. 3 is a block diagram of certain logic circuits employed in the system of FIG. 2.

FIG. 3 illustrates in detailed block diagram form the components of logic section 31, gate 28 and shift register 30. The subgroup detector 20, decode matrix 24 and FSK generator 36 are not illustrated herein in detail since these components may comprise commercially available items in which modification, if any, required for the present purposes would be trivial. The circuits shown in FIG. 3 are illustrated purely for explanatory purposes and do not per se comprise a portion of this invention since other circuits can provide the required control functions.

The subgroup detector 20 provides DC outputs on four lines labelled *f1*, *f2*, *f3* and *f4* in response to the receipt of incoming interrogation frequencies F1, F2, F3 and F4, respectively. A DC signal will be present on each detector output so long as the corresponding interrogating frequency is applied to the cable 11. These frequencies, as indicated previously, select a particular subscriber for interrogation and also operate to control the reply sequence.

Figure 4:
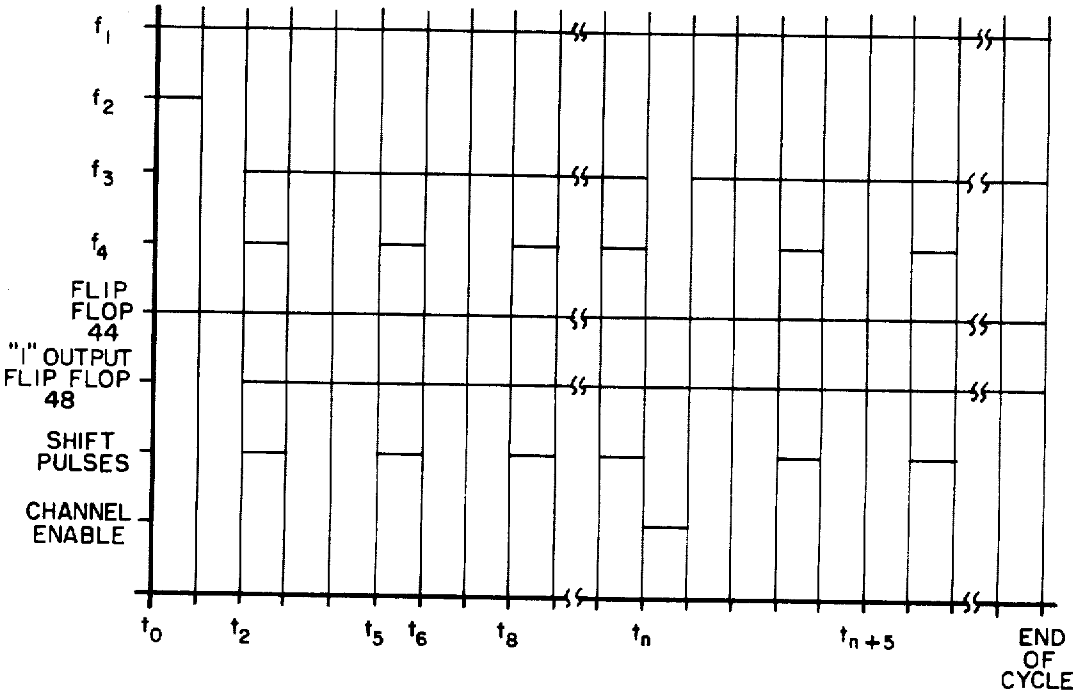
FIG. 4 is a timing chart showing when certain pulses are available in the system.

The operation of FIG. 3 is explained with further reference to the timing chart of FIG. 4 which represents a preferred interrogating cycle. In this illustrated embodiment, it is desired to first interrogate the subscriber to determine the condition of the data switches 32–35 and then to interrogate the subscriber station to determine the position of the selector switch 22 of the receiver. Accordingly, the cycle may be considered as consisting of two portions, the first one starting at $t_0$ and the second at $t_n$ as illustrated in FIG. 4.

In FIGS. 3 and 4, it is assumed that the interrogation frequencies required to interrogate the particular subscriber station illustrated are frequencies F1, F2, F3 and F4. Hence the subgroup detector 20 will provide four direct voltage outputs on its respective output lines in response to the receipt of these frequencies.

At the start of the interrogation cycle ($t_0$), frequencies F1 and F2 are transmitted, preferably on a time multiplexed basis. Accordingly, the subgroup detector outputs *f1* and *f2* (which exist simultaneously despite the multiplexed input) are coupled through AND gate 42 to the set input of a flip-flop 44. In this description, the illustrated flip-flops are considered as bistable two-state devices which may be either in a set (S) or reset (R) condition, depending upon receipt of an incoming pulse on a correspondingly labelled input. When the flip-flop is set, the "1" output provides an enabling voltage while the "0" output is off. Conversely, when the flip-flop is reset, the "0" output provides the enabling voltage while the "1" output is off.

When flip-flop 44 is set by the simultaneous receipt of F1 and F2, it enables an AND gate 46 which receives F4 and F3 inputs. Hence, at time $t_2$ (FIG. 4) AND gate 46 is opened to set a flip-flop 48 via OR gate 62. When flip-flop 48 is set, its "0" output is in the off state and the switch enable lines 31A becomes deenergized. The channel enable line 31B remains in its normally disabled condition so that no new data is permitted to be coupled to the shift register 30 via gate 28.

Gate 28 may be considered as consisting of eight AND gates 50–57 and four OR gates 58–61. Gates 51, 53, 55 and 57 are responsive to the data switches 32, 33, 34 and 35, respectively. These gates are normally enabled by the switch enable signal on line 31A so that during the period when flip-flop 48 is in its normal reset condition, the voltages on the closed data switches are passed through the corresponding AND gates 51, 53, 55, 57 and associated OR gates 58, 59, 60 and 61 to the respective stages of shift register 30 shown in FIG. 3 as 30A, 30B, 30C and 30D.

Hence, under ordinary circumstances, the four stages of the shift register represent the condition of the data switches 32–35. When the first pulse appears on line *f4* (at time $t_2$), it is coupled through an AND gate 70 which has been enabled by the set outputs of flip-flops 44 and 48. The output of AND gate 70 serves as the source of shift pulses for the shift register 30, causing, in a well known way, the data in each of the registers to be shifted to the right (as illustrated) with the information content of the last register (30D) being coupled to the FSK generator 36 (FIG. 1) where it causes a binary "1" or "0" to be transmitted back to the central station on the telephone line. The set output of flip-flop 48 (on line 31D) may be used in an obvious way to enable the FSK generator so that it is ready to transmit when the first binary digit is shifted from register 30.

Each successive F4 pulse generates a shift pulse at the output of AND gate 70, which causes a continuous transfer of data until, upon receipt of four such shift pulses, all of the information stored in the shift register has been serially removed and transmitted back to the central station by the FSK generator 36.

At this point in time (the end of the first-half portion of the interrogation cycle, $t_n$) the shift register has been emptied and is ready to receive the channel selection data from the switch 22 via decode matrix 24. Frequency F3 terminates at $t_n$ (FIG. 4). This closes gate 47 through an inverter 72 which keeps set input at flip-flop 48 enabled via OR gate 62 and simultaneously applies a channel enable signal on line 31B to AND gates 50, 52, 54 and 56. This signal on line 31B enables gates 50, 52, 54 and 56 to connect the output of the decode matrix 24 in parallel through the OR gates 58–61 to the respective shift register stages 30A, 30B, 30C and 30D.

At time $t_{n+L}$, the F3 frequency commences again opening gate 47 to remove the channel enable signal from line 31B. AND gate 70 remains enabled so that shift pulses from f4 can be coupled to the shift register 30 to provide for the serial readout of the shift register contents. At the end of the cycle, frequency F1 stops to reset flip-flops 44 and 48 through an inverter 76 removing all enabling voltages from the system. The system is now ready to interrogate the next group of subscribers.

Since the generation of the F1, F2, F3 and F4 frequencies is under program control, in the centrally located computer, it is possible to set up a mode of operation whereby the subscriber's terminal system is automatically reset at $t_n$ so that channel data may be bypassed. Alternatively, the frequency sequence may be programmed to transfer the channel data to the shift register during the first-half of the interrogation cycle and to bypass the switch data.

The use of a frequency shift key generator 36 has an advantage in that it provides a positive indication for both a binary "0" and a binary "1". For example, of the four subscribers in each subgroup, the first may have the frequencies 1,200 Hz and 1,500 Hz assigned as representative of "0" and "1". The frequencies 1,800 Hz and 2,100 Hz may be used by the second subscribers; the frequencies 2,400 Hz and 2,700 Hz by the third subscriber; and the frequencies 3,000 Hz and 3,300 Hz by the fourth subscriber. At the beginning of the interrogation cycle, the FSK generator is enabled by the output of the flip-flop 48. After the generator has been enabled, each time a "0" or a "1" is shifted out of the register 30, the generator will couple the appropriate audio tone to the telephone line. Although four subscribers are connected to each telephone line at any given time, the replies of these subscribers can be readily distinguished since different frequencies are assigned to each one. The time interval between successive shift pulses should be long enough to permit a digital bit to be read from the subscriber furthest from the central station and returned thereto before the next shift pulse.

If it is desired to indicate the condition of the shift register 30, the set outputs of each of the shift register stages may be connected to respective lamp drivers and indicator lamps as diagrammatically illustrated at the bottom of FIG. 3. Also, a switch 80 may be provided so that the user can clear the shift register at any desired time. Interlocking circuits, as described above, are provided so that during an interrogation cycle it will not be possible to change the condition of the shift register by operation of the data switches 32–35. A similar interlock is included in the system, as described above, to prevent a change in position of the channel selector switch from affecting readout during the second half of the interrogation cycle.

Depending upon the number of subscribers, the number of interrogation frequencies required will vary. Where approximately 1,000,0000 subscribers are contemplated, as in the illustrated embodiment of the invention, 10 separate interrogation frequencies may be used. These interrogation frequencies are sent in two sequences of two each, with the latter sequence consisting of frequencies other than those used for the first sequence. With this particular arrangement, it is possible to provide 1,260 different combinations of frequencies taken four at a time; hence, where it is possible for four subscribers to share the same telephone line, there will be 5,040 (4 × 1,260) subscribers on each telephone line. Assuming 200 separate telephone lines, this provides for a total capacity slightly in excess of 1,000,0000.

In the future, it may be possible to transmit information in both directions along a cable. In such a case, it will not be necessary to use the telephone lines to communicate between the subscriber and the central station. Because of the much greater bandwidth possible when cable is used as a transmission path, it will be possible to simultaneously couple many subscribers to the cable at the same time during the interrogation cycle and distinguish between them on the basis of the radio frequency reply frequencies.

Numerous modifications of the invention will be obvious to those skilled in the art. As indicated previously, many different combinations of frequencies may be used to interrogate the subscribers. Instead of reading the information from the data switches into the shift register for subsequent serial readout, the actuation of one (or more) of the data switches may cause a multi-digit code to be transmitted directly back to the central station. Where bandwidth permits the subscriber data may be returned in parallel (using different FSK oscillators for each bit position) instead of serially. This will require a trade-off as far as bandwidth is concerned and would reduce the number of subscribers which could be coupled to a single telephone line at any one time; however, in certain cases it may still result in a desirable saving of time.

What is claimed is:

1. A subscriber video receiving system in which each subscriber has a receiver tunable by channel selector means to any one of a plurality of video channels for receiving video information, data switch means and a transponder for transmitting back to a central station information indicative of the selected channel to which the receiver is tuned and the condition of said data switch means, wherein tones are transmitted from said central station to said transponder to select a transponder for interrogation, such selection being dependent upon the frequencies of said tones, wherein each transponder comprises
   - a multi-stage storage register for storing digital information representative of said selected channel or said data switch condition,
   - read-out means responsive to at least one preselected one of said tones for causing the digital information in said storage register to be read from the storage register for transmission to a utilization device, and
   - means responsive to at least one preselected one of said tones for selectively coupling said channel selector means or said data switch means to said storage register.

2. A subscriber video receiving system according to claim 1, wherein said storage register comprises a shift register from which data is read in serial form, and wherein said first named preselected tone comprises a series of pulses, said read-out means including means responsive to said pulses for coupling shift pulses to said shift register.

3. A subscriber video system according to claim 1, further including
   - means responsive to the output of said register for transmitting one of at least two additional frequencies to said utilization device depending upon the digital state of the information read from the register.

4. A subscriber video system according to claim 2, further including
   - means responsive to the output of said register for transmitting one of at least two additional frequencies to said utilization device depending upon the digital state of the information read from the register.

5. a subscriber video receiving system according to claim 4, further including
   - means responsive to said channel selector means for producing a multi-bit digital signal corresponding to the channel to which said receiver is tuned, said coupling means including means for transferring said multi-bit digital signal to said shift register in parallel.

6. A transponder for use in a subscriber video receiving system in which each subscriber has a receiver tunable by channel selector means to any one of a plurality of video channels for receiving video information and for transmitting back to a central station information indicative of the selected channel to which an associated receiver is tuned, wherein tones are transmitted from said central station to said transponder to select the transponder for interrogation, such selection being dependent upon the frequencies of said tones, comprising
   - data switch means,
   - a multi-stage storage register for storing digital information representative of said selected channel or said data switch condition,
   - read-out means responsive to at least one preselected one of said tones for causing the digital information in said storage register to be read from the storage register for transmission to a utilization device, and means responsive to at least one preselected one of said tones for selectively coupling said channel selector means or said data switch means to said storage register.

7. A transponder according to claim 6, wherein said storage register comprises a shift register from which data is read in serial form, and wherein said first named preselected tone comprises a series of pulses, said read-out means including means responsive to said pulses for coupling shift pulses to said shift register.

8. A transponder according to claim 6, further including means responsive to the output of said register for transmitting one of at least two additional frequencies to said utilization device depending upon the digital state of the information read from the register.

9. A transponder according to claim 7, further including means responsive to the output of said register for transmitting one of at least two additional frequencies to said utilization device depending upon the digital state of the information read from the register.

10. A transponder according to claim 9, further including means responsive to said channel selector means for producing a multi-bit digital signal corresponding to the channel to which said receiver is tuned, said coupling means including means for transferring said multi-bit digital signal to said shift register in parallel.

11. A subscriber video receiving system in which each subscriber has a receiver tunable by channel selector means to any one of a plurality of video channels for receiving video information and a transponder for transmitting back to said central station information indicative of the selected channel to which the receiver is tuned, wherein tones are transmitted from said central station to said transponder to select a transponder for interrogation, such selection being dependent upon the frequencies of said tones, the improvement comprising a multi-stage shift register for storing digital information representative of said selected channel, means responsive to said channel selector means for producing a multi-bit digital signal corresponding to the channel to which said receiver is tuned, means for transferring said multi-bit digital signal to said shift register in parallel, means enabled by the receipt of a preselected plurality of said tones and responsive to at least one of said tones for coupling shift pulses to said shift register to serially transfer the stored data out of said shift register, and means responsive to the data transferred from said shift register for transmitting a corresponding digital signal to a utilization device.

12. A subscriber video system according to claim 11, wherein said transmitting means transmits one of at least two additional frequencies to said utilization device depending upon the digital state of the information read from the register.

13. A method of selectively interrogating the individual transponders of a group of transponders wherein each transponder includes means for returning information to a central station by means of preselected return frequencies and wherein predetermined subgroups of transponders are adapted to be selectively actuated in response to the receipt of preselected address tones received in a preselected sequence, comprising selecting a subgroup of transponders by transmitting to all of said transponders N address tones from an available number of M tones, and then transmitting to all of said transponders K tones taken from the remaining M-N tones to cause each of the transponders of said selected subgroup to transmit its return frequencies to the central station, and identifying the individual transponders within said desired subgroup by the frequencies of the return signals from the transponders within said desired subgroup.

14. The method of interrogating transponders according to claim 13, wherein at least one of said transmitted tones is transmitted in the form of a series of pulses to the selected subgroup of transponders with each of said pulses adapted to initiate the transmission of at least one bit of information from the transponders of said selected subgroup.

15. A method of selectively interrogating the individual transponders of a group of transponders wherein each transponder includes a storage register which contains digital information to be returned to a central station, the stored information being provided by a selected one of a plurality of input sources, and means for returning information to a central station by means of preselected return frequencies and wherein predetermined subgroups of transponders are adapted to be selectively actuated in response to the receipt of preselected address tones received in a preselected sequence, comprising selecting a subgroup of transponders by transmitting to all of said transponders N address tones from an available number of M tones, and then transmitting to all of said transponders K tones taken from the remaining M-N tones to cause each of the transponders of said selected subgroup to transmit its stored information on its return frequencies to the central station, and identifying the individual transponders within said desired subgroup by the frequencies of the return signals from the transponders within said desired subgroup.

16. A method of selectively interrogating transponders according to claim 15, wherein at least one of said address tones causes the selected input source to be coupled to said storage register for subsequent transmission to the central station.

17. The method of interrogating transponders according to claim 16, wherein at least one of said transmitted tones is transmitted in the form of a series of pulses to the selected subgroup of transponders with each of said pulses adapted to shift the stored data in said register on a bit-by-bit basis for readout in serial form.

18. A transponder for use in a system wherein a large number of transponders are interrogated by means of interrogating tones transmitted from a central station to the individual transponders, with the selection of the transponders being dependent upon the frequencies of said tones, and wherein each transponder is adapted to transmit signals to said central station derived from a selected one of two or more data sources, the combination comprising a multi-stage storage register for storing digital information to be returned to the central station, means responsive to at least one of said interrogating tones for selectively coupling one of said data sources to said storage register, and readout means responsive to at least one of said interrogating tones for causing the information stored in said register to be returned to the central station.

19. A transponder according to claim 18, wherein said readout means includes an FSK generator responsive to the data output from said storage register and means responsive to at least one of said interrogating tones for causing the contents of said register to be read-out in serial form.

* * * * *